United States Patent [19]

Chambers et al.

[11] Patent Number: 4,988,751
[45] Date of Patent: Jan. 29, 1991

[54] HALOGENATED VINYL POLYMER COMPOSITION AND METHOD FOR STABILIZING HALOGENATED VINYL POLYMER COMPOSITION CONTAINING SMOKE RETARDANTS

[75] Inventors: Scott R. Chambers, Charlotte, N.C.; Michael R. Croce, Brooklyn, N.Y.

[73] Assignee: Witco Corporation, New York, N.Y.

[21] Appl. No.: 345,038

[22] Filed: Apr. 28, 1989

[51] Int. Cl.$^5$ .......................... C08K 5/57; C08K 5/58
[52] U.S. Cl. .................................. 524/181; 524/100; 524/178; 524/180; 524/182; 524/405; 524/406
[58] Field of Search .............. 524/180, 181, 182, 178, 524/100, 406, 405; 556/61

[56] References Cited

U.S. PATENT DOCUMENTS

| | | | |
|---|---|---|---|
| 2,641,596 | 6/1953 | Leistner et al. | 524/181 |
| 2,648,650 | 8/1953 | Weinberg et al. | 524/181 |
| 2,914,506 | 11/1959 | Mack et al. | 524/181 |
| 3,398,114 | 8/1968 | Pollock | 524/181 |
| 3,424,712 | 1/1969 | Gottlieb et al. | 524/181 |
| 3,562,305 | 2/1971 | Hoch | 524/181 |
| 3,565,930 | 2/1971 | Kauder et al. | 524/181 |
| 3,565,931 | 2/1971 | Brecker | 524/181 |
| 3,769,263 | 10/1973 | Mayo et al. | 524/181 |
| 3,817,915 | 6/1974 | Kauder et al. | 524/181 |
| 3,821,151 | 6/1974 | Mitchell | 524/406 |
| 3,845,001 | 10/1974 | Mitchell | 524/406 |
| 3,870,679 | 3/1975 | Mitchell et al. | 524/406 |
| 3,878,167 | 4/1975 | Kroenke | 524/406 |
| 3,933,741 | 1/1976 | Larkin et al. | 524/181 |
| 4,008,201 | 2/1977 | Weisfeld | 524/181 |
| 4,053,452 | 10/1977 | Kroenke | 524/406 |
| 4,053,453 | 10/1977 | McRowe et al. | 524/406 |
| 4,053,455 | 10/1977 | Kroenke | 524/406 |
| 4,161,466 | 7/1979 | Kroenke | 524/406 |
| 4,234,473 | 11/1980 | Kroenke | 524/406 |
| 4,235,770 | 11/1980 | Kroenke | 524/406 |
| 4,240,955 | 12/1980 | Kroenke | 524/406 |
| 4,248,766 | 2/1981 | Kroenke | 524/406 |
| 4,248,767 | 2/1981 | Kroenke | 524/406 |
| 4,255,320 | 3/1981 | Becker et al. | 524/180 |
| 4,406,837 | 9/1983 | Kroenke | 556/57 |
| 4,406,838 | 9/1983 | Kroenke | 556/57 |
| 4,406,840 | 9/1983 | Kroenke | 556/57 |
| 4,418,169 | 11/1983 | Gibbons et al. | 524/178 |
| 4,425,279 | 1/1984 | Kroenke | 524/567 |
| 4,698,368 | 10/1987 | Muller | 524/180 |

FOREIGN PATENT DOCUMENTS 1251854  11/1971  United Kingdom .

OTHER PUBLICATIONS

H. Verity Smith, The Development of the Organotin Stabilizer, 1959.

*Primary Examiner*—Veronica P. Hoke
*Attorney, Agent, or Firm*—Lockwood, Alex, Fitzgibbon & Cummings

[57] ABSTRACT

Halogenated vinyl polymer compositions containing molybdenum smoke retardants and organotin compounds having an overall ratio of sulfur to tin of not more than 1.7 gram atoms of sulfur per gram atom of tin, typically from about 0.6 to about 1.7 and preferably from about 0.6 to about 0.9 gram atoms of sulfur per gram atom of tin.

36 Claims, No Drawings

HALOGENATED VINYL POLYMER COMPOSITION AND METHOD FOR STABILIZING HALOGENATED VINYL POLYMER COMPOSITION CONTAINING SMOKE RETARDANTS

BACKGROUND OF THE INVENTION

This invention generally relates to the heat and light stabilization of halogenated vinyl polymer compositions containing a smoke retardant. More particularly, the present invention relates to the use of organotin stabilizers to provide improved heat and light stabilization of rigid halogenated vinyl polymer compositions containing molybdenum smoke retardants involving the use of mixtures of organotin compounds. In this regard, an important aspect of this invention concerns the use of mixtures of certain organotin compounds in halogen containing vinyl resin compositions which contain molybdenum smoke retardants to provide improved resistance of such polymer compositions to degradation caused by heat and light without incurring discoloration or staining of the polymer compositions.

In the absence of a smoke retardant, the burning of halogen containing vinyl polymers, particularly vinyl chloride polymers, causes the formation of large amounts of smoke. This smoke is extremely hazardous and its prevention is desirable to meet environmental standards and to prevent human injury caused by smoke inhalation.

Consequently smoke retardants are commonly added to halogenated vinyl polymers. Among often used smoke retardants are molybdenum compounds. Numerous molybdenum compounds are shown in the literature to be useful as smoke retardants in vinyl polymers.

U.S. Pat. No. 4,053,455 to Kroenke discloses the use of amine molybdates as retardants for smoke formed by the burning of vinyl chloride and vinylidene chloride polymers. U.S. Pat. No. 4,161,466, also to Kroenke, identifies amine molybdates as retarding smoke formation during the burning of polyamides, polychloroprene, polymonoolefins and other polymers; U.S. Pat. No. 3,870,679 to Mitchell et. al. shows the use of molybdenum hexacarbonyl as a smoke retardant for polyvinyl halides: and dodecyl-1,2-diammonium dimolybdate is proposed by U.S. Pat. No. 4,234,473 to Kroenke as a smoke retardant additive for vinyl chloride and vinylidene chloride polymer compositions.

Also disclosed as being useful as flame retardants for vinyl chloride and vinylidene chloride polymers are ammelinium beta-octamobybdate (U.S. Pat. No. 4,235,770 to Kroenke) octadecylammonium alpha-octamolybdate (U.S. Pat. No. 4,240,955 to Kroenke); didecylammonium beta-octamolybdate (U.S. Pat. No. 4,248,766 to Kroenke); dodecylammonium alpha-octamolybdate (U.S. Pat. No. 4,248,767 to Kroenke); methyltricaprylammonium molybdates (U.S. Pat. No. 4,406,837 to Kroenke): trioctylammonium molybdates (U.S. Pat. No. 4,406,838 to Kroenke): tri (tridecyl) ammonium molybdates (U.S. Pat. No. 4,406,840 to Kroenke) and tridodecyl ammonium molybdates (U.S. Pat. No. 4,425,279 to Kroenke).

Also certain molybdenum compounds described in the literature are suitable smoke suppressants when used in combination with other compounds. U.S. Pat. No. 3,845,001 to Mitchell proposes a copper oxide-molybdenum oxide mixture; U.S. Pat. No. 3,821,151 to Mitchell suggests cast iron powder admixed with a molybdenum oxide; U.S. Pat. No. 4,053,452 to Kroenke proposes mixtures of melamine molybdate or substituted melamine molybdate with cobalt carbonate, cobalt oxide, colbalt acetylacetonate and hydrates thereof and U.S. Pat. No. 4,053,453 to McRowe et al. proposes combinations of copper oxalate and amine molybdates.

Also the literature contains numerous disclosures of organotin stabilizers for halogen containing vinyl polymer. H. Verify Smith in his 1959 compilation, *The Development of The Organotin Stabilizers*, discusses the early activity in the production of tin stabilizers and their function particularly in vinyl chloride homopolymers in preventing dehydrochlorination, oxidation, chain scission and cross-linkage.

One of the most preferred class of halogenated vinyl polymer stabilizers are the organotin mercapto carboxylic acid esters. These materials are discussed in U.S. Pat. Nos. 2,641,596 to Leistner et al. and 2,648,650 to Weinberg et al. Organotin sulfide-containing mercapto carboxylic acid esters are described in U.S. Pat. Nos. 3,565,930 to Kauder et al., 3,565,931 to Brecker and 3,817,915, also to Kauder et al. U.S. Pat. No. 3,769,263 to Mayo et al. describes stabilizer compositions containing alkyltin sulfides in admixture with alkytin mercaptocarboxylic acid esters. While U.S. Pat. No. 4,255,320 to Brecker et al. describes stabilizer compositions containing alkyltin sulfides in admixture with mono-and dialkyltin 2-acyloxyethylmercaptides.

Several types of sulfur-free organotin compounds have been suggested in which a hydrocarbon group is directly attached to tin through a carbon atom, and an oxygen-containing group, such as an ester group, is attached to tin through oxygen. Organotin compounds of this type, such as dibutyltin dilaurate, are excellent light stabilizers but are relatively poor heat stabilizers at the high temperatures, such as 350° F. to 400° F., commonly used today to process polyvinyl chloride compositions for siding, and window and door profiles.

A number of organotin stabilizers have been proposed that include a mercapto carboxylic acid ester moiety as well as a carboxylate moiety in a single compound or in a combination of two or more compounds. For example, U.S. Pat. No. 2,914,506 to Mack et al. discloses compounds broadly defined by the formula $RR'Sn(SX)(Z)$ wherein R and R' may be the same or different monovalent hydrocarbon radicals, SX may be, among other things, an ester of a mercapto acid, and Z may be, among other things, a carboxylic acid linked through the oxygen of the carboxylic acid group to the tin atom.

According to U.S. Pat. No. 3,562,305 to Hoch the incorporation into an organotin mercapto acid ester of a small amount of organotin carboxylate yields products having a substantially reduced tendency to decompose on standing and are at least as effective as the untreated organotin mercapto acid esters as stabilizers for vinyl halide resin compositions.

United Kingdom Pat. No. 1,251,864 to M&T International N.V., discloses compositions for stabilizing halogen-containing resins against the deleterious effects of heat which compositions can comprise an organotin mercapto acid ester, such as dibutyltin bis (iso-octyl) mercaptoacetate, and an organotin carboxylate such as butyltin tris (laurate). Additionally, U.S. Pat. No. 4,698,368 to Muller, discloses a stabilizer composition that can include an organotin mercaptopropionate and organotin carboxylate.

These patents as well as others, such as U.S. Pat. No. 3,810,868 to Weisfeld et al., provide sufficient information to those skill-in-the-art to produce these organotin mercapto acid esters and organotin carboxylates.

It is also well known to those skilled-in-the-art to incorporate additives such as phenolic antioxidants in the organotin stabilizer compositions for enhanced performance. The art is replete with example of such additives such as those disclosed in U.S. Pat. Nos. 3,398,114 to Pollock, 3,424,717 to Gottlieb et al and 4,418,169 to Gibbons et al.

Many of these stabilizers and additives have achieved some measure of success at stabilizing halogen-containing resins against the degradative action of heat and light, but there are many applications in which a greater degree of heat and light stability is desired than has heretofore been readily attainable. Additionally, not all of these stabilizers are homogeneous liquid at room temperatures. Such homogenity is a characteristic often desired by end users for handling and processing ease. Those skilled-in-the-art recognize that although certain organotin stabilizers exhibit different heat and light stability property there is no definitive predictive rule for providing a stabilizer composition that has all the features of liquid homogeneity, initial color control, processing heat stability, light stability, and overall processability.

Thus, an enormous array of organotin stabilizers have been shown and patented in attempts to resolve various problems encountered during the processing and use of the products encountered during the processing and use of the products made from the halogenated vinyl polymers. Some offer more effective protection from heat during the compounding of the vinyl polymer, while others afford protection against light during the use of the fabricated objects. Some prevent degradation during the early heating of the vinyl polymer while other stabilizers are more effective at higher temperatures.

Without the use of heat and light stabilizers, particularly organotin stabilizers the use of halogenated vinyl polymers would not be practical due to the degradation that would occur during processing and use of the halogenated vinyl polymers. For this purpose there is now available a wide variety of organotin stabilizers.

The selection of the proper organotin stabilizer is further complicated by the presence of other additives in the halogenated vinyl polymer. Thus, for example, the presence of a molybdenum containing smoke retardant in the halogenated vinyl polymer can cause difficulty with the use of organotin stabilizers due to the formation of molybdenum reaction products. These undesired by-products can cause discoloration and staining of the polymer.

Accordingly, it is an object of the present invention to provide a method of stabilizing halogenated vinyl polymers containing smoke retardants.

Another object of the present invention is to provide stain-free halogenated vinyl polymers compositions that are stabilized against degradation by light and heat and also are capable of suppressing smoke formed by the burning of vinyl polymers.

Still another object of the present invention is to provide stable halogenated vinyl polymer compositions containing molybdenum smoke retardants.

Still another object of the present invention is to provide polymer compositions that are stain-free.

Other objects will become apparent from the ensuing description.

SUMMARY OF THE INVENTION

The present invention provides a stabilized halogenated vinyl polymer which contains a suppressant for smoke formed during the burning of the polymer composition. These halogenated vinyl polymer compositions comprise a halogenated vinyl polymer, a molybdenum smoke retardant and an organotin stabilizer having an overall an overall ratio of sulfur to tin of not more than 1.7 gram atoms of sulphur per gram atom of tin. Also the present invention provides a method for stabilizing halogenated vinyl polymer compositions containing smoke retardants.

DETAILED DESCRIPTION OF THE INVENTION

Due to their need for stabilization the present invention is particularly directed to chlorinated polyvinyl polymers The most important of these polymers are vinyl chloride and vinylidene chloride polymers, including homopolymers, copolymers and blends of homopolymers and/or copolymers. The vinyl chloride and vinylidene chloride polymers may contain from 0 to about 50 percent by weight of at least one other olefinically unsaturated monomer. Suitable monomers include 1-olefins containing from 2 to 12 carbon atoms such as ethylene, propylene, 1-butene, isobutylene, 1-hexene, 4-methyl-l-pene, and the like; dienes containing from 4 to 10 carbon atoms, including conjugated dienes such as butadiene, isoprene, piperylene, and the like; ethylidene norbornene and dicyclopentadiene; vinyl esters and allyl esters such as vinyl acetate, vinyl chloroacetate, vinyl propionate; vinyl laurate, alkyl acetate, and the like; vinyl aromatics such as styrene, a-methyl styrene, chlorostyrene, vinyl toluene, vinyl naphthalene, and the like; vinyl and allyl ethers and ketones such as vinyl methyl ether, allyl methyl ether, vinyl isobutyl ether, vinyl n-butyl ether, vinyl chloroethyl ether, methylvinylketone, and the like; vinyl nitriles such as acrylonitrile, methacrylonitrile, and the like; cyanoalkyl acrylates such as a-cyanomethyl acrylate, the $\alpha$ and $\beta$-cyanopropyl acrylates, and the like olefinically unsaturated carboxylic acids and esters thereof, including olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methyl methacrylate, ethyl methacrylate, butyl methacrylate, glycidyl methacrylate, and the like; and including esters of maleic and fumaric acid, and the like; amides of the olefinically unsaturated carboxylic acids such as acrylamide, and the like, divinyls, diacrylates and other polyfunctional monomers such as divinyl benzene, divinyl ether, diethylene glycol diacrylate, ethylene glycol dimethacrylate, methylene-bisacrylamide, allyl pentaerythritol, and the like; and bis (chloroethyl vinyl phosphonate and the like.

The vinyl chloride and vinylidene chloride polymer, may contain the usual compounding ingredients known to the art such as fillers, opacifiers, lubricants, processing aids, impact modifiers, plasticizers, antioxidants, and the like.

As previously mentioned, the literature describes numerous molybdenum compounds useful as smoke retardants for halogenated vinyl polymers as well as the preparation thereof. Particularly useful molybdenum compounds are ammonium and amine molybdates. Ammonium molybdates useful for this purpose include ammonium molybdate, ammonium dimolybdate, ammonium heptamolybdate, ammonium octamolybdate, didodecylammonium octamolybdate, dodecylammonium molybdate, methyltricapryl ammonium molybdate, trioctyl ammonium molybdate, tri(tridecyl) ammonium molybdate, tridodecylammonium molybdate, and the like.

Amine molybdates useful as smoke suppressants include polymeric amines as well as simple amines. The simple amines may contain from 1 to 40 carbon atoms and from 1 to 10 primary, secondary or tertiary amines or mixtures thereof. Simple amines including aliphatic amines, alicyclic amines, aromatic amines, and heterocyclic amines The ammonium and amine molybdates are present in the halogenated vinyl polymers in a smoke retarding amount, typically from about 0.01 to about 20 parts per 100 parts by weight of the polymer, preferably from about 1 to about 10 parts per 100 parts by weight of the polymer. The smoke retardant can be in the form of poly crystalline or amorphous fine powders, preferably with an average particle size from about 0.01 to about 800 microns.

Unfortunately the formation of undesired reaction products is often encountered when molybdenum smoke retardants are used with various heat and/or light organotin stabilizers containing relatively high sulfur contents. This in turn causes discoloration of the polymers and staining of the processing equipment. In accordance with the present invention, however, it has been found that this undesired discoloration and staining can be avoided.

Organotin stabilizers useful in the present invention have an overall ratio of sulfur to tin of not more than 1.7 gram atoms of sulfur per gram atom of tin and typically from about 0.6 to about 1.7, preferably from about 0.6 to about 0.9 gram atoms of sulfur per gram atom of tin. The selection of the specific organotin stabilizer will depend on a variety of factors such as whether heat or light stability is the more important factor, whether early heat stability is significant, the type of processing the polymer will undergo, the specific polymer selected, the identity of the other components of the formulation, the type of object to be prepared from the polymer, and other factors.

The organotin stabilizers of the present invention can be mixtures of organotin compounds. This mixture of organotin compounds can contain a sulfur-containing organotin compound and a non-sulfur containing organotin compound. It can also be a mixture of sulfur containing organotin compounds. This mixture of sulfur-containing organotin compounds can be a mixture of organotin mercaptides and organotin sulfides.

A particularly suitable mixture of organotin compounds that are useful as a stabilizer in the present invention comprise mixtures of organotin mercapto carboxylic acid esters and organotin carboxylates. Typically the organo groups are alkyl groups of from 1 to 6 carbon atoms, preferably methyl or butyl. There is no need for the organo groups to be identical and for certain applications it is preferred that they be distinct. A particularly useful organotin mercapto carboxylic acid ester can be represented by the following structural formula $R_mSnX_{(4-m)}$ wherein R is lower alkyl and X represents an ester of a mercapto carboxylic acid having 2 to 6 carbon atoms with an alcohol having 4 to 14 carbon atoms whose sulfur atom is linked to the tin atom and m is 1 or 2. Compounds wherein m is higher than 2 are not contemplated by the present invention. Illustrative of these compounds are the following: Monomethyltin tris isooctylthioglycolate, dimethyltin bis isoctylthioglycolate, monomethyltin bis isooctyl-3-mercaptopropionate, dimethyltin bis isooctyl-3-mercaptopropionate, monomethyltin tris 2-ethylhexylthioglycolate, dimethyltin bis 2-ethylhexylthioglycolate, monomethyltin tris 2-ethylhexyl-3-mercaptopropionate, dimethyltin bis 2'ethyl-hexyl-3-mercaptopropionate, and the like. In accordance with the aspects of providing a homogeneous stabilizer and long term heat stability to the resin, preferred alkyltin mercapto acid ester stabilizers are the methyltin isooctylthioglycolates such as monomethyltin tris isooctylthioglycolate and dimethyltin bis isooctylthioglycolate. In accordance with other aspects of the invention such as providing the vinyl chloride polymers with initial color control and processing heat stability, preferably a mixture of monomethyltin mercapto carboxylic acid ester and dimethyltin mercapto carboxylic acid ester is present. More preferably, a mixture of dimethyltin isooctylthioglycolate and monomethyltin isooctylthioglycolate in proportions of approximately four parts by weight to one part by weight, respectively, is present.

The alkyltin carboxylate component of these mixtures be can be represented by the structural formula $R'_nSnY_{(4-n)}$ wherein R' is lower alkyl, Y represents

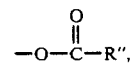

R" is selected from the group consisting of alkyl groups having from 8 to 13 carbon atoms and alkenyl groups having from 8 to 21 carbon atoms, and n is 1 to 2. Compounds wherein n is greater than 2 are not contemplated by the present invention.

Illustrative of these organotin carboxylates are the following: Dibutyltin dioctanoate, dibutyltin didecanoate, dibutyltin neodecanoate, dibutyltin dilaurate, dibutyltin dioleate, dibutyltin ditallate, and the like.

In accordance with the objectives of the present invention, preferred butyltin carboxylates are dibutyltin dilaurate, dibutyltin dioleate, and dibutyltin ditallate.

It has been found that when methyltin mercapto carboxylic acid esters, such as methyltin isooctylthioglycolates, are blended with butyltin carboxylates such as dibutyltin dilaurate, a homogeneous stable liquid mixture is formed. Preferably the blend comprises 25–75% by weight of the methyltin mercapto carboxylic acid ester and 25–75% by weight of the butyltin carboxylate. More preferably, the blend comprises approximately 50% by weight of the methyltin mercapto carboxylic acid ester and approximately 50% by weight of the butyltin carboxylate. Most preferably the blend comprises a mixture of 46% by weight of the methyltin mercapto carboxylic acid ester and 54% by weight of the butyltin carboxylate.

Another organotin stabilizer that is useful for the present invention contains the two components previously described; i.e., an organotin mercapto carboxylic acid ester and an organotin carboxylate and as a third component a di(lower alkyl)tin oxide. In the present invention, the term lower means a branched or straight chain alkyl group having from 1 to about 6 carbon atoms.

A particularly useful dialkyltin oxide is dibutyltin oxide. In these combinations the organotin mercapto carboxylic acid can be present in an amount of about 40 to about 50 weight percent of the organotin stabilizer; the organotin carboxylate comprises from about 25 to about 35 weight percent of the stabilizer and the di(-lower alkyl)oxide in from about 25 to about 55 weight percent of the stabilizer.

These organotin stabilizers may be used in stabilizing amounts to inhibit the heat and light induced degradation of a halogenated vinyl polymer. Typically they may be used in amounts of 0.1 to 10 parts by weight of 100 parts by weight of the polymer. Preferably these blends may be used in the amount of 0.5 to 3, and more preferably 1.0 to 1.75, parts per 100 part of the polymer.

The compositions of the present invention can also include an antioxidant component that can be organic compound capable of inhibiting deterioration of organic substances in the presence of oxygen. Preferred antioxidant components are the phenolic antioxidants such as 1,1,3-tris (2-methyl-4-hydroxy-5-t-butylphenyl) butane. Typically, the phenolic antioxidant component will be used in any amount of 0.1 to 5 parts per weight of the organotin stabilizer. More preferably, the antioxidant is used in an amount of approximately 3% by weight.

The following examples illustrate, but are not intended to limit, the present invention.

EXAMPLE 1

| Component | Parts By Weight |
|---|---|
| Polyvinylchloride homopolymer | 100 |
| Titanium Oxide | 10 |
| Acrylic Impact Modifier | 8 |
| Acrylic Process Aid K-120N | 1 |
| Acrylic Process Aid K-175 | 0.5 |
| Magnesium Oxide | 10 |
| Organo Tin Stabilizer A | 1.5 |
| Ammonium Octamolybdate | 2.5 |

Organo tin stabilizer A is a mixture of 54 percent by weight of di-n-butyltin dilaurate and 46 percent of a mixture of 80 percent by weight dimethyl tin isooctylthioglycolate and 20 percent by weight monomethyltin isooctylthioglycolate.

EXAMPLE 2

| Component | Parts By Weight |
|---|---|
| Polyvinylchloride homopolymer | 100 |
| Titanium Oxide | 10 |
| Acrylic Impact Modifier | 8 |
| Acrylic Process Aid K-120N | 1 |
| Acrylic Process Aid K-175 | 0.5 |
| Magnesium Oxide | 10 |
| Organotin Stabilizer B | 1.5 |
| Ammonium Octamolybdate | 2.5 |

Organotin Stabilizer B is a mixture of 44 percent by weight of dibutyltin bis (isooctyl 3-mercaptopropionate) 28 percent by weight dibutyltin dilaurate and 28 percent by weight solubilized dibutyl tin oxide.

The above Examples illustrate halogenated vinyl polymers of the present invention containing a molybdenum smoke retardant and organotin stabilizer. These compositions of the present invention are not characterized by discoloration or staining which occurs from the use of organotin stabilizers having relatively higher sulfur to tin contents.

These formulations can be prepared by standard procedures for the preparation of vinyl halide formulations without the need for the modification of equipment.

While in the foregoing specification certain embodiments and examples of this invention have been described in detail, it will be apparent that modifications and variations therefrom will be apparent to those skilled in this art and that this invention is to be limited only by the scope of the appended claims.

We claim:

1. A halogen containing polymer composition substantially resistant to staining comprising a halogenated vinyl polymer, a smoke retardant amount of at least one molybdenum smoke retardant and an effective stabilizing amount of an organotin stabilizer comprising a mixture of organotin compounds, said organotin stabilizer having an overall ratio of sulfur to tin of not more than 1.7 gram atoms of sulfur per gram atom of tin.

2. The composition of claim 1 wherein said organotin stabilizer has an overall ratio of sulfur to tin of from about 0.6 to about 1.7 gram atoms of sulfur per gram atom of tin.

3. The composition of claim 1 wherein said organotin stabilizer has an overall sulfur to tin ratio of from about 0.6 to about 0.9 gram atoms of sulfur per gram atom of tin.

4. The composition of claim 1 wherein said mixture of organotin compounds includes a sulfur-containing organotin compound and a non-sulfur containing organotin compound.

5. The composition of claim 1 wherein said organotin stabilizer is a mixture of sulfur-containing organotin compounds.

6. The composition of claim 1 wherein said mixture of organotin compounds includes organotin mercaptides and organotin sulfides.

7. The composition of claim 1 wherein said mixture of organotin compounds includes an organotin mercapto carboxylic acid ester and an organotin carboxylate.

8. The composition of claim 7 wherein the organotin mercapto carboxylic acid ester has the structural formula $R_mSnX_{(4-m)}$ wherein R is lower alkyl, X is an ester of a mercapto carboxylic acid having about 4 to about 14 carbon atoms whose sulfur atom is linked to a tin atom and m is 1 or 2.

9. The composition of claim 8 wherein the organotin carboxylate has the structural formula: $R'_nSnY_{(4-n)}$ wherein R' is lower alkyl; Y is

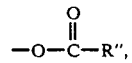

wherein R'' is selected from the group consisting of alkyl groups having from about 8 to about 13 carbon atoms and alkenyl groups having from about 8 to about 21 carbon atoms and n is 1 or 2.

10. The composition of claim 7 wherein the organotin mercapto acid ester comprises about 25 to about 75 weight percent of the organotin stabilizer and the organotin carboxylate comprises about 25 to about 75 weight percent of the organotin stabilizer.

11. The composition of claim 7 wherein the organotin stabilizer also contains a di(lower alkyl) tin oxide.

12. The composition of claim 9 wherein the halogenated vinyl polymer is a homopolymer of vinyl chloride.

13. The composition of claim 8 wherein R is methyl.

14. The composition of claim 9 wherein R' is butyl.

15. The composition of claim 7 wherein the organotin mercapto carboxylic acid ester is a mixture of mono and dialkyl mercapto carboxylic acid esters.

16. The composition of claim 8 wherein X is isooctyl thioglycolate.

17. The composition of claim 7 wherein the organotin mercapto carboxylic acid ester is a mixture of mono and dimethyltin isooctyl thioglycolates.

18. The composition of claim 9 wherein the organotin carboxylate is di-n-butyltin laurate.

19. The composition of claim 1 wherein the molybdenum smoke retardant is selected from the group consisting of amine and ammonium molybdates.

20. The composition of claim 19 wherein the molybdenum smoke retardant is ammonium octamolybdate.

21. A method of providing improved heat and light stabilization in a halogenated vinyl polymer composition which includes a molybdenum smoke retardant without incurring discoloration or staining in said polymer composition, comprising incorporating into the halogenated vinyl polymer composition an organotin stabilizer comprising a mixture of organotin compounds having an overall ratio of sulfur to tin of not more than 1.7 gram atoms of sulfur per gram atom of tin.

22. The method of claim 21 wherein said organotin stabilizer has an overall sulfur to tin ratio of from about 0.6 to about 1.7 gram atoms of sulfur per gram atom of tin.

23. The method of claim 21 wherein said organotin stabilizer has an overall sulfur to tin ratio of from about 0.6 to about 0.9 gram atoms of sulfur per gram atom of tin.

24. The method of claim 21 wherein said organotin stabilizer is a mixture of sulfur-containing organotin compounds.

25. The method of claim 23 wherein said organotin stabilizer includes a sulfur-containing organotin compound and a non-sulfur containing organotin compound.

26. The method of claim 23 wherein said mixture of compounds includes organotin mercaptides and organotin sulfides.

27. The method of claim 21 wherein the halogenated vinyl polymer is a vinyl chloride homopolymer.

28. The method of claim 21 wherein the molybdenum smoke retardant is selected from the group consisting of amine and ammonium molybdates.

29. The method of claim 21 wherein the organotin stabilizer comprises an organotin mercapto carboxylic acid ester and an organotin carboxylate.

30. The method of claim 29 wherein the organotin mercapto carboxylic acid ester has the structural formula $R_mSnX_{(4-m)}$ wherein R is lower alkyl, X is an ester of a mercapto carboxylic acid having about 4 to about 14 carbon atoms whose sulfur atom is linked to a tin atom and m is 1 or 2.

31. The method of claim 30 wherein the organotin carboxylate has the structural formula: $R'_nSnY_{(4-n)}$ wherein R' is lower alkyl; Y is

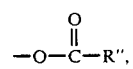

wherein R'' is selected from the group consisting of alkyl groups having from about 8 to about 13 carbon atoms and alkenyl groups having from about 8 to about 21 carbon atoms and n is 1 or 2.

32. The method of claim 30 wherein the organotin mercapto acid ester comprises about 25 to about 75 weight percent of the organotin stabilizer and the organotin carboxylate comprises about 25 to about 75 weight percent of the organo tin stabilizer.

33. The method of claim 29 wherein the organotin mercapto carboxylic acid ester is a mixture of mono and dialkyl mercapto carboxylic acid esters.

34. The method of claim 30 wherein X is isooctyl thioglycolate.

35. The method of claim 31 wherein the organotin carboxylate is di-n-butyltin laurate.

36. The method of claim 21 wherein the molybdenum smoke retardant is ammonium octamolybdate.

* * * * *